United States Patent [19]

Logothetis

[11] Patent Number: 5,260,351
[45] Date of Patent: Nov. 9, 1993

[54] RADIATION CURING OF PERFLUOROELASTOMERS

[75] Inventor: Anestis L. Logothetis, Wilmington, Del.

[73] Assignee: E. I. Du Pont de Nemours and Company, Wilmington, Del.

[21] Appl. No.: 33,061

[22] Filed: Mar. 17, 1993

Related U.S. Application Data

[63] Continuation of Ser. No. 747,318, Aug. 20, 1991, abandoned, which is a continuation-in-part of Ser. No. 347,329, Apr. 24, 1989, abandoned.

[51] Int. Cl.$^5$ .................................................. C08J 3/28
[52] U.S. Cl. ..................................... 522/152; 522/151; 526/247; 526/254; 525/360
[58] Field of Search ................ 522/151, 152; 526/247, 526/254; 525/331, 360

[56] References Cited

U.S. PATENT DOCUMENTS

| | | | |
|---|---|---|---|
| 3,142,629 | 2/1961 | Timmerman | 526/255 |
| 3,223,689 | 12/1965 | Haszeldine . | |
| 3,513,043 | 5/1970 | Burnside . | |
| 4,035,565 | 7/1977 | Apotheker et al. | 525/368 |
| 4,256,856 | 3/1981 | Ito et al. . | |
| 4,281,092 | 7/1981 | Breazeale | 526/247 |
| 4,529,784 | 7/1985 | Finlay | 526/247 |
| 4,565,614 | 1/1986 | Buding et al. . | |
| 4,972,038 | 11/1990 | Logothetis | 526/247 |
| 4,983,697 | 1/1991 | Logothetis | 526/254 |
| 5,104,911 | 4/1992 | Marchionni et al. | 522/156 |

OTHER PUBLICATIONS

R. E. Usehold Some Effects of Ionizing Radiation on Tetrafluoroethylene Copolymers 1984 pp. 1335–1344.

*Primary Examiner*—Marion E. McCamish
*Assistant Examiner*—S. Rosasco

[57] ABSTRACT

Perfluoroelastomers cured by radiation and characterized by an absence of curing agent residues in the cured product.

12 Claims, No Drawings

RADIATION CURING OF PERFLUOROELASTOMERS

CROSS-REFERENCE TO RELATED APPLICATION

This is a continuation of application Ser. No. 07/747,318, filed Aug. 20, 1991, now abandoned, which is a continuation-in-part of copending application Ser. No. 07/347,329, filed Apr. 24, 1989, now abandoned.

BACKGROUND OF THE INVENTION

Perfluoroelastomers have long been used in a variety of applications that require excellent resistance to high temperatures, oxidative and chemical attack. One particularly outstanding fluoropolymer that has been used in elastomeric applications is that prepared from tetrafluoroethylene (TFE) and perfluoro (methyl vinyl) ether (PMVE). To permit the crosslinking in these copolymers that is essential to good elastomeric properties, a small percentage of termonomer is incorporated, as described, for example, in Finlay, U.S. Pat. No. 4,529,784, Apotheker et al., U.S. Pat. No. 4,035,565, and Breazeale, U.S. Pat. No. 4,281,092.

In the past, such perfluoroelastomers have been cured by compounding with the dipotassium salt of bis-phenol AF ($K_2AF$) or peroxide curing agents, followed by treatment with elevated heat and/or pressure to cure the polymer. While these techniques have produced excellent cured products, it would be desireable to have a similar cured product without the presence of the curing agent residues, which can exude during subsequent processing or use. Fluoropolymers have, in the past, been treated with ionizing radiation to promote curing, as described, for example in U.S. Pat. Nos. 3,223,689, 3,513,043, 4,256,856, and 4,565,614. However, such techniques have previously been limited to those compositions which were not perfluorinated. It was previously concluded that radiation would tend to degrade a perfluoropolymer without effective curing.

SUMMARY OF THE INVENTION

The present invention is based on the discovery that certain perfluoroelastomers can be cured with radiation alone, without the compounding with curing agents that was previously thought necessary.

A process for curing a perfluoropolymer derived from tetrafluoroethylene, a perfluoroalkyl perfluorovinyl ether wherein the alkyl group contains 1 to 5 carbon atoms, and up to about 2 mole percent of cure site monomer units derived from ethylenically unsaturated compounds, the units being selected from those having at least one of nitrile, perfluorophenyl, bromo- and iodo- substituents, the units being present in an amount sufficient to provide at least about 0.1 mole percent of at least one of perfluorophenyl, nitrile, bromine and iodine in the resulting terpolymer, which process comprises exposing the perfluoropolymer to about from 2 to 20 megarads of electron beam radiation, in the substantial absence of curing agent.

The present invention further provides cured perfluoroelastomers resulting from the above process, the perfluoroelastomers being substantially free from curing agent residue.

DETAILED DESCRIPTION OF THE INVENTION

The present invention relates to fully fluorinated polymers, such as those prepared from tetrafluoroethylene, a perfluoroalkyl perfluorovinyl ether in the which the alkyl group contains from 1 to 5 carbon atoms, and up to about two mole percent of cure site or crosslinking units. A wide variety of such crosslinking units can be used, including, for example, cyano-substituted perfluorovinyl ethers as described in Breazeale, U.S. Pat. No. 4,328,092; bromine-containing olefins as described in Apotheker et al., U.S. Pat. No. 4,035,565. In general, the cure-site monomers are present in an amount sufficient to provide at least about 0.1 mole percent of at least one of nitrile, perfluorophenyl, bromine or iodine in the resulting terpolymer. The nitrile, perfluorophenyl, bromine, or iodine functionalities can be part of the same ethylenically unsaturated monomer or can be provided by different ethylenically unsaturated monomers Preferably, two or more different cure site moieties are used. Accordingly, the cure site monomer can be selected from ethylenically unsaturated compounds having (i) nitrile or perfluorophenyl and (ii) bromo- or iodo- substituents, the units being present in an amount sufficient to provide at least about 0.1 mole percent each of perfluorophenyl or nitrile and bromine or iodine in the resulting terpolymer.

Blends of perfluoroelastomers can also be used in the present invention, including, for example, those described in Aufdermarsh, U.S. Pat. No. 4,413,094, also hereby incorporated by reference.

The present invention is based on the discovery that these perfluoropolymers can be cured without the curing agents that have been used in the past, but by exposure to radiation in an amount of about from 2 to 20 megarads. Exposure to less than about 2 megarads does not provide reliable elastomer performance, while little additional benefit is obtained with more than about 20 megarads. Dosages of about from 6 to 16 megarads have been found to be particularly satisfactory. The radiation can be applied in a single dose or in multiple applications. Multiple applications can minimize heat buildup in the polymer being treated.

The radiation can be applied to the perfluoroelastomers by a radiation source which has the following characteristics:

1. A high voltage power supply that generates DC power and creates the acceleration potential for the electrons.
2. An accelerator to raise the electrons to their full potential energy.
3. A scanning system which uniformly distributes the accelerated beams of electrons over the required area.

The exposure to the radiation can be for a period of a few seconds to several minutes, depending on the intensity of the radiation source. A wide variety of commercially available radiation sources can be used, including, for example, high energy Van de Graaf electron beam accelerators, such as that commercially available from High Voltage Engineering as Model K-S. The curing can be carried out at ambient pressure and temperatures of about from 20° to 40° C.

The polymers used in the present invention should be formed into their desired final configuration prior to curing, as with typical elastomers and curing processes.

If, for example, the polymer is formed into a film, the film will vary in thickness considerably, depending on the intended use. However, in general, the perfluoroelastomer films will exhibit a thickness of about from 0.05 to 2.5 mm. In the alternative, the polymers can be formed into a variety of shaped articles, as will be evident to those skilled in the art.

The cured perfluoroelastomers exhibit excellent tensile properties, and are substantially free from curing agent residue; that is, the cured products prefereably have less than 500 parts per million, and especially less than 100 parts per million, of such residue. Accordingly, the cured compositions provide substantially chemical free perfluoroelastomeric parts, which have heretofore been unavailable using previously known curing techniques.

The polymers can also contain one or more of the additives known to be useful in fluoropolymer compositions, such as pigments, fillers, pore-forming agents and plasticizers.

The present invention is further illustrated by the following specific examples, in which parts and percentages are by weight unless otherwise indicated.

EXAMPLES 1-12

In Examples 1-12, perfluoroelastomer compositions were prepared from 54 to 58 weight % tetrafluoroethylene, 40 to 44 weight % perfluoro (methylvinyl ether) and a cure site monomer. The cure site monomers used and their concentrations were as follows:

Examples 1-3—1.1 weight % 4-bromo-3,3,4,4-tetrafluorobutene

Examples 7-9—2.2 weight % perfluoro-(8-cyano-5-methyl-3,6-dioxa-1-octene)

In Examples 4-6, a blend of the perfluoroelastomer of Examples 1-3 and 15% of a melt processable TFE copolymer ("Teflon" PFA fluoropolymer) was used. In Examples 10-12, a blend of the perfluoroelastomer of Examples 7-9 and 15% "Teflon" PFA fluoropolymer was used.

In each example, the perfluoroelastomer was formed into an O-ring and then cured by exposure to radiation, using a 3 MEV electron beam Van de Graaf accelerator. The radiation dosages used varied, as summarized in Table I. The resulting cured O-rings were evaluated for their tensile properties, including Stress at 100% Strain, Tensile Strength at Break and Elongation at Break, using ASTM Method D412, and the results are reported in Table I. The O-rings were post cured in an oven at 232° C. for a period of 16 hours. Control samples that had not been irradiated did not survive the post cure treatment without distortion. Each sample, if tested, would exhibit less than 100 ppm of curing agent residue.

These results indicate that cured perfluoroelastomers can be obtained using radiation alone, providing finished products without the curing agent residue that previously was present when using conventional curing agents.

TABLE I

| | Example | | | |
|---|---|---|---|---|
| | 1-3[2] | 4-6[2] | 7-9 | 10-12 |
| 8 MRADS | | | | |
| M100 | 310 | 540 | 295(245) | 490(455) |
| TB | 540 | 850 | 650(590) | 990(950) |
| EB | 205 | 220 | 210(265) | 230(280) |
| 12 MRADS | | | | |

TABLE I-continued

| | Example | | | |
|---|---|---|---|---|
| | 1-3[2] | 4-6[2] | 7-9 | 10-12 |
| M100 | 310 | 550 | 300(240) | 555(480) |
| TB | 470 | 830 | 605(595) | 950(715) |
| EB | 174 | 202 | 184(262) | 185(195) |
| 16 MRADS | | | | |
| M100 | 335 | 550 | 300(270) | 580(485) |
| TB | 455 | 710 | 605(560) | 910(820) |
| EB | 153 | 150 | 173(235) | 168(220) |

[1] The values in parentheses are post-cured at 232C/16 hrs under nitrogen.
[2] Did not survive post-cure.

EXAMPLES 13-24 and CONTROL EXAMPLES A-D

In Examples 13-24 and Control Examples A-D, perfluoroelastomer compositions were prepared from the same weight percentages of tetrafluoroethylene and perfluoro (methylvinyl ether) as in Examples 1-12 along with a cure site monomer. The cure site monomers used and their concentrations were as follows:

Examples 13-18 and Controls A-B—2.2 wt % perfluoro-(8-cyano-5-methyl-3,6-dioxa-1-octene)

Examples 19-24 and Controls C-D—1.1 wt % 4-bromo-3,3,4,4-tetrafluorobutene

These fluoropolymers were made in an aqueous emulsion using ammonium persulfate as an initiator.

In some of the compositions, as indicated in Table II, 2.0 parts per hundred of the resin of trimethyl allylisocyanurate radical trap (TMAIC) were added to the perfluoroelastomer. The perfluoropolymers of Examples 13-18 and Control Examples A-B contained 12 phr SAF reinforcing agent and 0.25 phr 18-Crown-6 as a processing aid. The perfluorpolymers of Examples 19-24 and Control Examples C-D contained 10 phr SAF black reinforcing agent and 0.25 phr 18-Crown-6 as a processing aid. The perfluoropolymers of Examples 19-24 and Control Examples C-D also contained 3.0 phr of lead oxide.

In each example, the perfluoropolymer was compounded into a dumbbell and then cured by exposure to radiation as described above. The radiation dosages used for the Control Examples A-D were 4 megarads, and varied for Examples 19-24 from 8 to 16 megarads, as summarized in Table II. The compounds were all post cured at 232° C. for 16 hours under Nitrogen. The resulting elastomers were evaluated for tensile properties as in Examples 1-12, and the results are reported in Table II.

TABLE II

| | Example | | | |
|---|---|---|---|---|
| | A and 13-15 | B and 16-18 | C and 19-21 | D and 22-24 |
| TMAIC,phr | — | 2.0 | — | 2.0 |
| 4 MRADS | | | | |
| M100 | 694 | 730 | 406 | 701 |
| TB | 2094 | 1900 | 437 | 1306 |
| EB | 242 | 254 | 523 | 323 |
| 8 MRADS | | | | |
| M100 | 934 | 946 | 399 | 779 |
| TB | 2027 | 1746 | 509 | 1630 |
| EB | 164 | 163 | 471 | 217 |
| 12 MRADS | | | | |
| M100 | 1119 | 1295 | 428 | 870 |
| TB | 1809 | 1666 | 823 | 1198 |
| EB | 133 | 119 | 364 | 134 |
| 16 MRADS | | | | |
| M100 | 1209 | — | 448 | 1107 |

TABLE II-continued

| | Example | | | |
|---|---|---|---|---|
| | A and 13-15 | B and 16-18 | C and 19-21 | D and 22-24 |
| TB | 1585 | 1659 | 990 | 1291 |
| EB | 118 | 91 | 280 | 112 |

EXAMPLES 25-36 and CONTROL EXAMPLES E-H

In Examples 25-36 and Control Examples E-H, the general procedure of Examples 1-18 was repeated, using the unblended polymers. Accordingly, the perfluoropolymer of Examples 1-3 was used in Examples 25-30 and Control Examples E and F; and the perfluoropolymer of Examples 13-15 was used in Examples 31-36 and Control Examples G and H. 2 phr TMAIC were added as indicated in Table III. All compounds contained 10 phr SAF black reinforcing agent and 0.25 phr 18-Crown-6 as a processing aid.

In each Example and Control Example, the perfluoroelastomer was formed into an O-ring and then cured by exposure to radiation, followed by post-cure at 232° C. for 16 hours.

The cured perfluoroelastomers were evaluated for compression set resistance, and the results summarized in Table III.

TABLE III

| | Example | | | |
|---|---|---|---|---|
| | Cntrl E & 25-27 | Cntrl F & 28-30 | Cntrl G & 31-33 | Cntrl H & 34-36 |
| TMAIC,2PHR | None | Yes | None | Yes |
| Compression Set Resistance 200C/70 hrs | | | | |
| 4 Mrads | 100 | 77 | 75 | 81 |
| 8 Mrads | 96 | 49 | 61 | 72 |
| 12 Mrads | 86 | 44 | 55 | 58 |
| 16 Mrads | 60 | 42 | 49 | 48 |

I claim:

1. A process for curing a perfluoropolymer derived from tetrafluoroethylene, a perfluoroalkyl perfluorovinyl ether wherein the alkyl group contains 1 to 5 carbon atoms, and up to about 2 mole percent of cure site monomer units derived from ethylenically unsaturated compounds, the units being selected from those having at least one of nitrile, perfluorophenyl, bromo- and iodo-substituents, the units being present in an amount sufficient to provide at least about 0.1 mole percent of at least one of perfluorophenyl, nitrile, bromine, and iodine in the resulting terpolymer, which process comprises exposing the perfluoropolymer to about from 2 to 20 megarads of electron beam radiation, in the substantial absence of curing agent.

2. A process of claim 1 wherein the perfluoropolymer is exposed to about from 6 to 16 megarads of radiation.

3. A process of claim 1 wherein the cure site monomer units are derived from ethylenically unsaturated compounds having (i) nitrile or perfluorophenyl and (ii) bromo- or iodo- substituents, the units being present in an amount sufficient to provide at least about 0.1 mole percent each of perfluorophenyl or nitrile and bromine or iodine in the resulting terpolymer.

4. A process of claim 1 wherein the terpolymer is prepared from tetrafluoroethylene, a perfluoroalkyl perfluorovinyl ether and 4-bromo-3,3,4,4-tetrafluorobutene-1.

5. A process of claim 1 wherein the terpolymer is prepared from tetrafluoroethylene, a perfluoroalkyl perfluorovinyl ether and perfluoro-(8-cyano-5-methyl-3,6-dioxa-1-octene).

6. A process of claim 1 wherein the radiation is applied in a single dose.

7. A process of claim 1 wherein the radiation is applied in two or more dosages.

8. Cured perfluoroelastomer resulting from the process of claim 1, the perfluoroelastomer being substantially free from curing agent residue.

9. A cured perfluoroelastomer of claim 8, consisting essentially of tetrafluoroethylene, a perfluoroalkyl perfluorovinyl ether and 4-bromo-3,3,4,4-tetrafluorobutene-1.

10. A cured perfluoroelastomer of claim 8, consisting essentially of tetrafluoroethylene, a perfluoroalkyl perfluorovinyl ether and perfluoro-(8-cyano-5-methyl-3,6-dioxa-1-octene).

11. A cured perfluoroelastomer of claim 8 having less than 500 parts per million of curing agent residue.

12. A cured perfluoroelastomer of claim 11 having less than 100 parts per million of curing agent residue.

* * * * *